F. O. CREAGH-OSBORNE & A. J. HUGHES.
MAGNETIC COMPASS.
APPLICATION FILED JULY 1, 1916.

1,256,442.

Patented Feb. 12, 1918.
4 SHEETS—SHEET 1.

Inventors
F. O. Creagh-Osborne
and A. J. Hughes.
by Wilkinson, Giuda & Mackay
Attorneys.

F. O. CREAGH-OSBORNE & A. J. HUGHES.
MAGNETIC COMPASS.
APPLICATION FILED JULY 1, 1916.
1,256,442.
Patented Feb. 12, 1918.
4 SHEETS—SHEET 3.
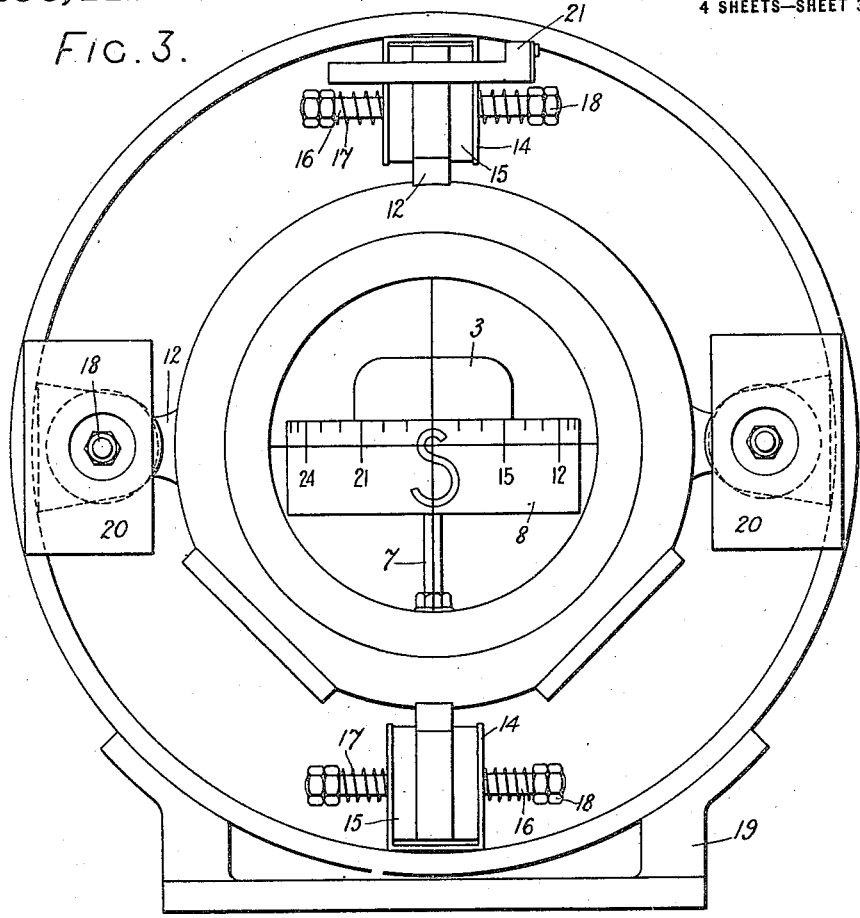
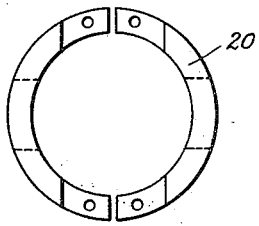
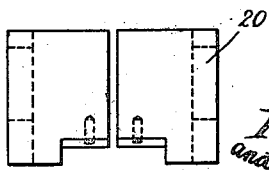
Inventors.
F. O. Creagh-Osborne,
and A. J. Hughes.
by Wilkinson, Guiata Mackay
Attorneys

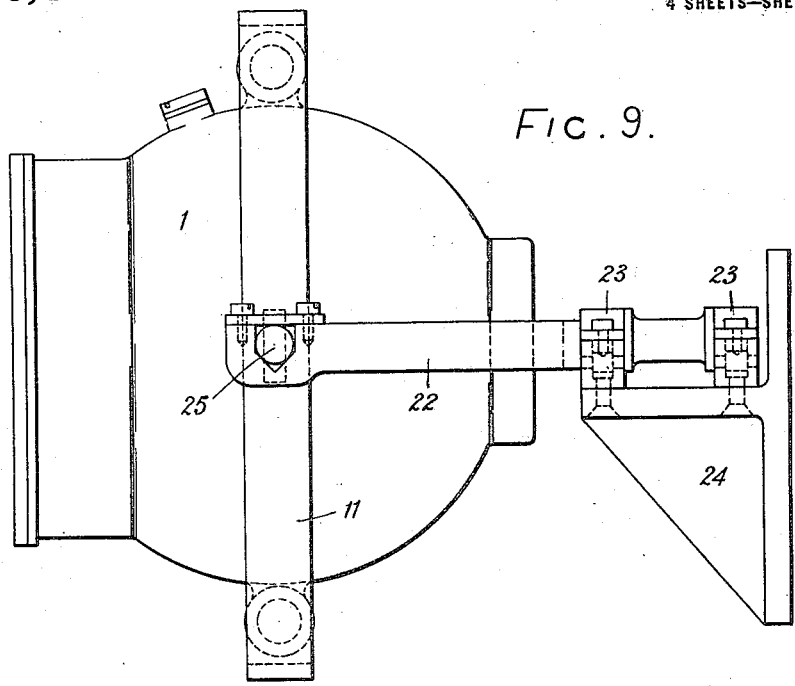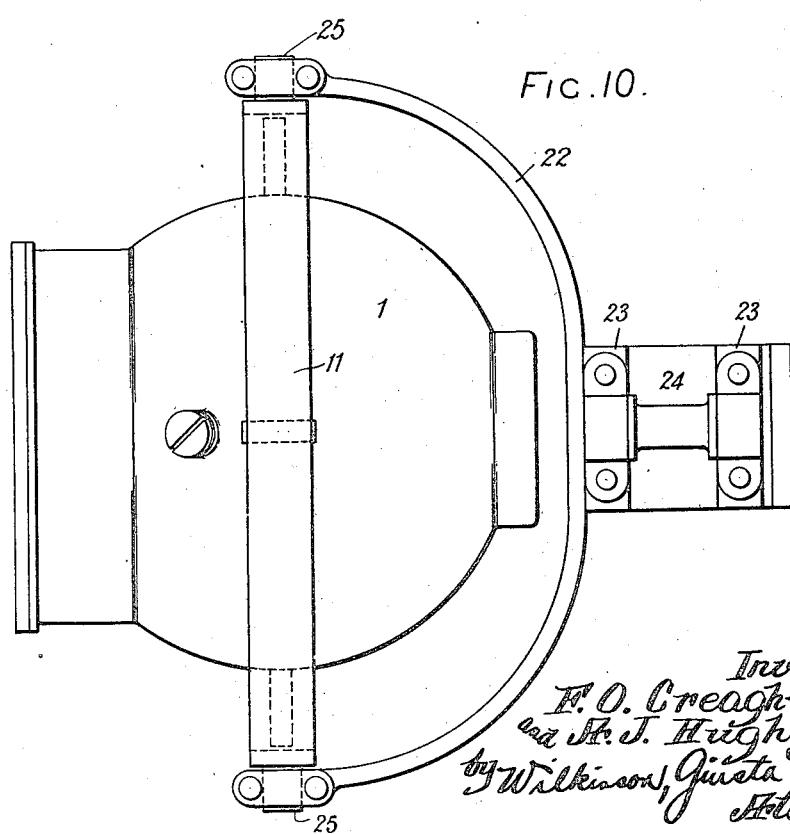

UNITED STATES PATENT OFFICE.

FRANK C. CREAGH-OSBORNE, OF WOKING, AND ARTHUR J. HUGHES, OF LONDON, ENGLAND.

MAGNETIC COMPASS.

1,256,442.  Specification of Letters Patent.  Patented Feb. 12, 1918.

Application filed July 1, 1916. Serial No. 107,190.

*To all whom it may concern:*

Be it known that we, FRANK OSBORNE CREAGH-OSBORNE and ARTHUR JOSEPH HUGHES, both subjects of the King of Great Britain, and residing, respectively, at Westcroft, Horsell, Woking, in the county of Surrey, England, and 59 Fenchurch street, in the city of London, England, have invented a new and useful Improvement in and Relating to Magnetic Compasses, of which the following is a specification.

This invention relates to magnetic compasses, more particularly, but not exclusively, for use on marine vessels, or on aircraft, and it consists in an improved mode of construction designed to minimize errors due to vibration, quick turning movements, or tilting.

A compass constructed according to this invention is provided with a magnetic system which is free to move with a period of oscillation damped in proportion to the moment of inertia and to the magnetic moment of the system. This may be accomplished by employing a single magnet or two or more magnets arranged about the center of the system in such a manner as to obtain the particular period of oscillation required.

The accompanying drawings are illustrative of a liquid compass embodying the present invention, Figure 1 being a view of the compass in vertical section.

Fig. 2 a plan view, and

Fig. 3 a view of the compass in front elevation.

Figs. 7 and 8 illustrate correcting magnets employed at the side of the compass.

Fig. 9 is a side elevation and

Figure 1:
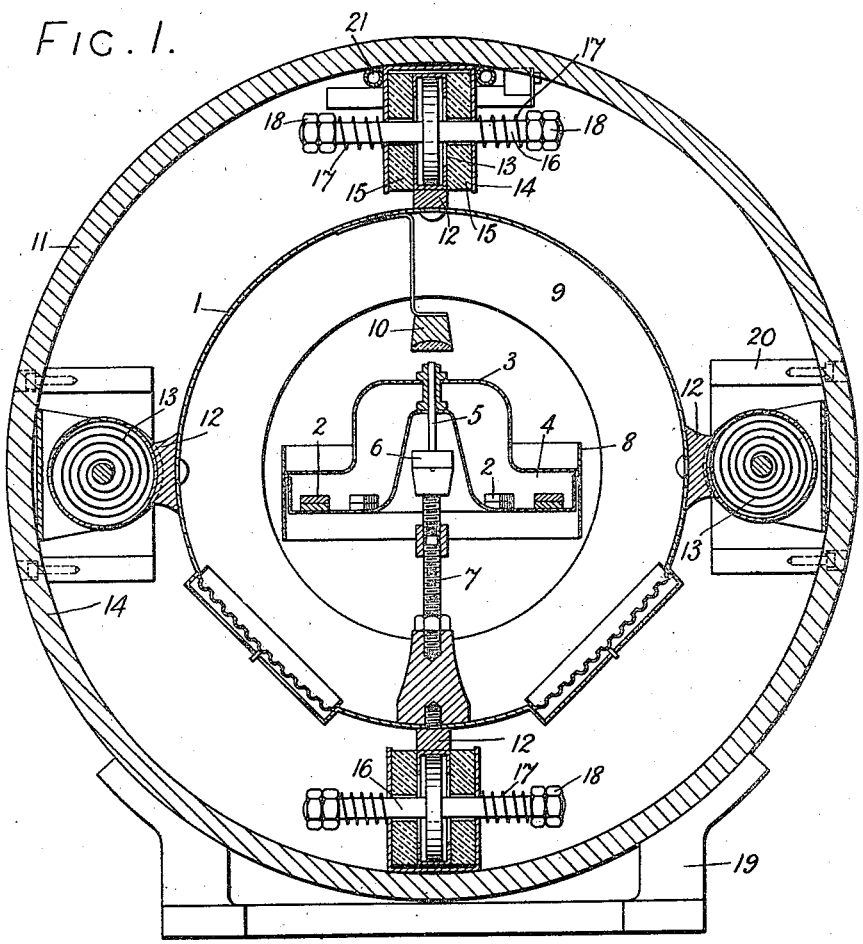

Fig. 10 a plan view illustrating a mode of mounting the compass.

In the construction illustrated, the magnetic system is mounted within an approximately barrel-shaped bowl 1 which is filled with a liquid of the desired specific gravity, say .960, and the magnets 2 are mounted within a hollow float having a raised central portion 3 in the form of a dome and an annular portion 4. The shape of the bowl is such as to provide an approximately equal amount of space on all sides of the float so that the damping effect of the liquid is evenly distributed over the float. The central portion 3 of the float is provided with a pivot pin 5 which is supported upon a sapphire cup 6 mounted upon a standard 7 fixed within the compass bowl 1. The pivot of the float is of such a character as to permit the float to tilt at least 30°. Around the periphery of the annular portion 4 of the float is mounted a compass card 8 of the known type having the graduations marked thereon vertically. Each end of the barrel-shaped bowl is provided with a transparent window 9; the two windows enabling the compass to be read from opposite directions at one time, but the compass bowl may be provided with a single window. Above the float and mounted upon the inside of the bowl 1 is a stop 10 to prevent the float from becoming detached from its support 7.

The compass bowl 1 is supported within a ring 11 from four points on axes at right angles to one another, and is provided with four lugs 12 each furnished with a spiral spring 13 housed within the lug. Each lug is held in a bracket 14 mounted upon the supporting ring 11 and between two washers 15 composed of felt or other suitable material. The washers are held against the lug by means of a rod 16 which passes through the lug and the washers and which is provided with two springs 17 each bearing at the one end against one of the washers and at the other end against an adjustable abutment such as nuts 18 upon the end of the said rod. In this manner any tendency for the compass bowl to vibrate is damped and the bowl remains stationary, while the vibratory movements are taken up by the supporting ring and suspension means which are free to move in a fore-and-aft direction, or thwartship or vertically.

To enable the supporting ring 11 to be attached either to a vertical wall on the one or the other side of the compass or to a horizontal wall above or below the compass, a block 19 is provided capable of being attached to the supporting ring at any one of the desired positions above or below or on either side of the compass. This block is attached in any suitable manner to the wall whereon the compass is to be mounted.

To correct quadrantal error and also to assist in controlling the compass card when turning from north to east or west, two opposite brackets are provided with soft iron tubes 20. Each tube is in two portions, as shown in Figs. 7 and 8 thus providing four sections so that adjustment for correction can be effected by removing one section or more as required. Furthermore, to correct semi-circular error the supporting ring is provided above the compass bowl 1 with four bras stubes 21 suitably arranged to house wire magnets.

Figure 5:
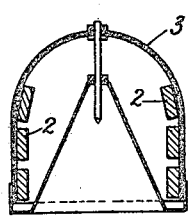
Fig. 5 is a view in vertical section of a modified construction of float.
Figure 6:
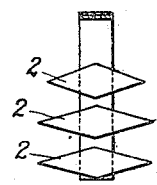
Fig. 6 is a side view showing the arrangement of the magnets at the side of the float.
Figure 2:
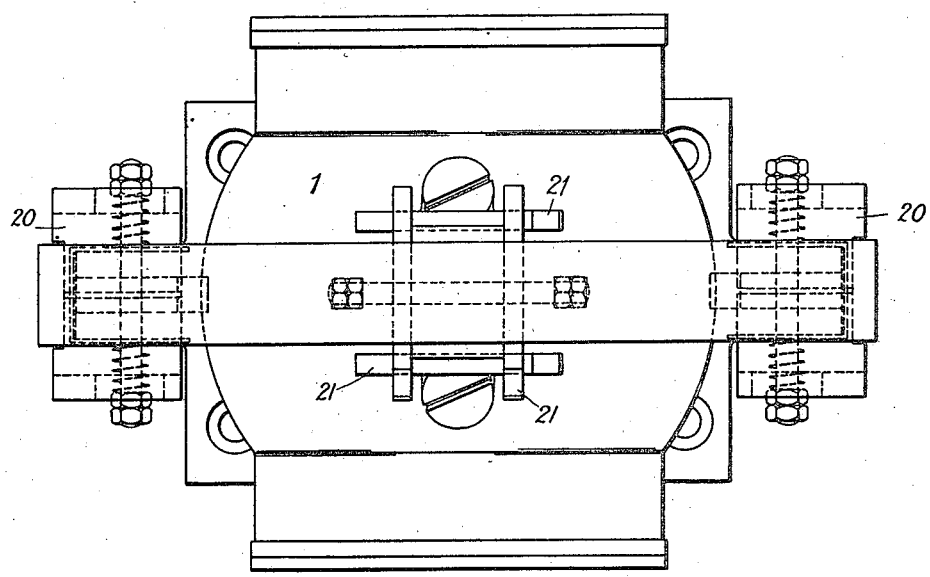

According to the modification illustrated in Figs. 5 and 6 the float may be in the form of a dome without an annular projecting portion, in which case the magnets 2 are disposed vertically one above the other upon the side wall of the float. In the construction illustrated six magnets are employed, there being two sets of three magnets disposed opposite to each other.

Figure 4:
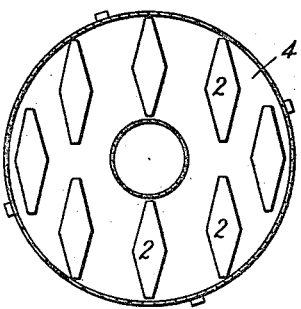
Fig. 4 is a plan view of the magnets mounted in the float.

As the result of experiments we have found that flat magnet-needles are preferable to round needles, and the best results were obtained with needles arranged as shown in Fig. 4. This arrangement gives magnetic stability and symmetrical distribution of mass to the float and assists retention of magnetism. The correct position of the needles is 30° between the outer poles, and the center of gravity should be brought as near as possible to the center of support.

With a float furnished with eight flat diamond-shaped needles the period of oscillation with a deflection of 45° was 45 seconds. Such a compass when employed on an aeroplane answered readily to small alterations of course, and when the machine was turned 8 points the card was steady on the new course in 30 seconds from the original alteration.

On marine vessels where the compass may be subjected to excessive rolling and pitching movements the ring 11 is preferably supported in gymbals. Any suitable and known form of gymbaling may be employed or we may employ the construction illustrated in Figs. 9 and 10. According to this construction, a yoke 22 is rotatably mounted in anti-friction bearings 23. 23, upon a bracket 24, and the arms of the yoke are formed to receive trunnions 25, 25, projecting from the ring 11 embracing the compass.

What we claim as our invention and desire to secure by Letters Patent, is:—

1. A magnetic compass comprising an approximately barrel-shaped bowl, a floating compass-card in said bowl, means provided on said bowl for observing said compass card, a supporting member embracing said compass card and adjustable yielding connections between said bowl and supporting member, substantially as and for the purposes specified.

2. A magnetic compass comprising an approximately barrel-shaped bowl, a floating compass card in said bowl, a support for said bowl, interconnecting brackets and lugs between said bowl and said support, and adjustable yielding connections between said brackets and lugs.

3. In a magnetic compass, the combination with an approximately barrel-shaped bowl of a supporting member embracing said bowl, inter-connecting brackets and lugs between said bowl and supporting member, a washer composed of yielding material disposed between each side of a bracket and lug, a spiral spring housed within said lug, a rod passing through the axis of said spring and projecting on either side of said lug, a helical spring supported upon each end of said rod, and an adjustable abutment at each end of said rod to control the pressure of said helical springs against said washers, substantially as described.

4. In a magnetic compass, the combination with an approximately barrel-shaped bowl, of a supporting member embracing said bowl, adjustable yielding connections between said bowl and supporting member, a floating compass card within said bowl, and soft iron tubes respectively disposed on two opposite connections between said bowl and supporting member, each said tube being in two pieces and serving to correct quadrantal error and to assist in controlling said compass card when turning movements are effected, substantially as described.

5. In a magnetic compass, the combination with an approximately barrel-shaped bowl, of a supporting member embracing said bowl, adjustable yielding connections between said bowl and supporting member, a floating compass card within said bowl, comparatively small tubes mounted upon said supporting member and in the vertical axis of said floating compass card, and wire magnets in said tubes for correcting semi-circular error in the compass, substantially as described.

6. In a magnetic compass, the combination with an approximately barrel-shaped bowl, of a ring embracing said bowl, adjustable yielding connections between said bowl and supporting member, and gymbals wherein said ring is mounted, substantially as described.

7. In a magnetic compass, the combination with an approximately barrel-shaped bowl, of a ring embracing said bowl, adjustable yielding connections between said bowl and ring, a yoke wherein said ring is pivotally mounted and anti-friction bearings wherein said yoke is rotatably mounted, substantially as described.

FRANK O. CREAGH-OSBORNE.
ARTHUR J. HUGHES.